US010652282B2

(12) United States Patent
Sim et al.

(10) Patent No.: US 10,652,282 B2
(45) Date of Patent: May 12, 2020

(54) BROKERED AUTHENTICATION WITH RISK SHARING

(71) Applicant: Microsoft Technology Licensing, LLC, Redmond, WA (US)

(72) Inventors: Robert Alexander Sim, Bellevue, WA (US); Akash Atul Shah, Seattle, WA (US); Jisheng Liang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 387 days.

(21) Appl. No.: 15/433,997

(22) Filed: Feb. 15, 2017

(65) Prior Publication Data
US 2018/0234464 A1 Aug. 16, 2018

(51) Int. Cl.
*H04L 29/06* (2006.01)
*H04L 9/32* (2006.01)
(52) U.S. Cl.
CPC .......... *H04L 63/205* (2013.01); *H04L 9/3213* (2013.01); *H04L 63/0807* (2013.01); *H04L 9/3231* (2013.01); *H04L 9/3247* (2013.01)
(58) Field of Classification Search
CPC . H04L 63/205; H04L 9/3213; H04L 63/0807; H04L 63/0823; H04L 63/083; H04L 9/3263; H04L 9/3228; H04L 9/3273; H04L 63/0281
See application file for complete search history.

(56) References Cited

U.S. PATENT DOCUMENTS 7,386,528 B2 6/2008 Maloche et al.
7,840,480 B2 11/2010 Kim-E
(Continued)

FOREIGN PATENT DOCUMENTS

WO 2013082190 A1 6/2013

OTHER PUBLICATIONS

"Transaction-level risk assessment for leading service provider of Online Remittances", http://www.brillio.com/insights/success-stories/transaction-level-risk-assessment, Retrieved on: Oct. 6, 2016, 5 pages.

*Primary Examiner* — Tongoc Tran

(57) ABSTRACT

Embodiments described herein are implemented in authentication brokering systems where an authentication broker issues security tokens that represent its authentications of users. Client devices operated by the users store the security tokens and send them to resource providers. The resource providers authenticate and grant access to the users based on validation of the security tokens. Authentication related messages exchanged between the resource providers and the authentication broker are used to exchange authentication risk data that is obtained or derived by the resource providers and the authentication broker. The resource providers obtain authentication risk data directly from the authentication broker and indirectly, via the authentication broker, from each other. As security tokens are used or managed, authentication risk data is shared among the participants in the authentication brokering system. The participants are able to modify their authentication procedures or make authentication decisions based on shared authentication risk data.

19 Claims, 9 Drawing Sheets

(56) References Cited

U.S. PATENT DOCUMENTS

| | | | |
|---|---|---|---|
| 8,949,938 B2* | 2/2015 | Sowatskey | H04L 63/0823 709/225 |
| 9,286,465 B1* | 3/2016 | Jain | G06F 21/41 |
| 9,954,839 B2* | 4/2018 | Ahmed | H04L 63/0807 |
| 9,998,463 B2* | 6/2018 | Panchapakesan | H04L 63/10 |
| 2001/0002485 A1* | 5/2001 | Bisbee | G06Q 20/00 713/167 |
| 2002/0138371 A1 | 9/2002 | Lawrence et al. | |
| 2005/0097320 A1* | 5/2005 | Golan | G06F 21/40 713/166 |
| 2005/0223217 A1* | 10/2005 | Howard | G06F 21/31 713/155 |
| 2009/0150299 A1 | 6/2009 | Moscal et al. | |
| 2009/0187988 A1 | 7/2009 | Hulten et al. | |
| 2011/0314532 A1* | 12/2011 | Austin | H04L 9/3213 726/8 |
| 2012/0096557 A1 | 4/2012 | Britton et al. | |
| 2013/0061285 A1 | 3/2013 | Donfried et al. | |
| 2013/0097701 A1 | 4/2013 | Moyle et al. | |
| 2016/0078436 A1 | 3/2016 | Tomasofsky et al. | |
| 2016/0259936 A1* | 9/2016 | Mukherjee | G06F 21/45 |
| 2017/0039568 A1* | 2/2017 | Tunnell | G06Q 20/4014 |

\* cited by examiner

200

```
<authentication data>
    <identity data>
        ...
    </identity data>
    <risk data>
        <risk data item>
            <source>[local|resource provider]</source>
            <time>...</time>
            <type>...</type>
            <value>...</value>
            <confidence>...</confidence>
            ...
        </risk data item>
    </risk data>
</authentication data>
```

FIG. 8

BROKERED AUTHENTICATION WITH RISK SHARING

BACKGROUND

People have benefited from the proliferation of online services and resources. Often, the more valuable an online service is, the more likely that the service will need to store sensitive information about subscribers. Securing such information and operations that can access and modify sensitive information is important. Most service providers implement security features for authentication and access control, typically using some form of user or subscriber identity. However, when a person subscribes to many services there may be efficiency and security problems. Credentials such as passwords are often forgotten and take time to reset or replace. People often use the same password for many different service accounts, which creates a security vulnerability.

Authentication brokering has been one solution to this problem of account and credential overload. An authentication broker is a service that enables a person to use one authentication (login) and one corresponding credential to authenticate themselves to any service provider that is configured to interoperate with the authentication broker. The authentication broker and service providers may each be managed as separate security domains (a security domain being a set of computers that authorize access based on a same credential, a computer may be in multiple security domains, and a resource provider may manage its own credentials for its own security domain while also participating in the brokered security domain). Typically, a user presents an identity (e.g., a user name) and one or more authentication factors to the authentication broker. The authentication broker evaluates the factors presented by the user and if they are found to be valid then the authentication broker considers the identity of the user to have been authenticated. Consequently, the authentication broker issues a credential—typically a token—that can be repeatedly used as a form of badge or pass for entry to the secure resource providers without having to manually log in each time.

When the user attempts to access an online resource of a resource provider using an authentication broker's token, the resource provider still has an authentication procedure. However, authentication is primarily based on the token rather than presentation of an authentication factor (e.g., a password) to the resource provider. Specifically, as part of the resource provider's authentication procedure, an agent, device, or client operated by the user presents the token to the resource provider. Then, the resource provider (in the case of self-contained tokens) or the authentication broker evaluates the token and if the token is validated then the resource provider is likely to authenticate the user; the resource provider may have other security measures related to authentication. Token validation is often a necessary but not necessarily sufficient condition for authentication.

A number of protocols and standards have been published for authentication brokering. For example, the OAuth 2.0 Authentication Framework (RFC 6749), the X.509 protocol, the Kerberos protocol, the Web Service Security Token Service (STS), the Security Assertion Markup Language (SAML) 2.0 protocol, among others. Procedures may conform to various Web Service (WS) specifications such as WS-TRUST specification. The nature of brokered authentication involves a natural separation between authentication providers and resource providers having respective security domains. The point of brokered authentication is to conveniently off-load authentication to a single convenient access point. Consequently, these brokered authentication protocols have tended to involve simple and unsophisticated exchanges between service providers and authentication brokers. With respect to authentication per se, authentication brokers generally provide basic answers to resource providers, such as "yes, token T is valid", "yes, token T is valid and it is expired", "no, token T is not valid", scope of a token, a time when a token was issued, etc.

Recently, more sophisticated user/identity authentication procedures have become common. Instead of merely authenticating a user with one or two factors and then granting wide access privileges, many authentication procedures have become more flexible and may take into account contextual factors as well as the nature of the resources that authentication would grant access to. Some circumstances of an authentication request may be associated with a heightened security concern. Deviation from patterns of prior authentications may also be considered. Generally, a rich set of information may inform an authentication decision by a resource provider or an authentication broker. However, there has been no appreciation that it could be beneficial to share this type of information among participants in an authentication brokering system. Only the inventors have recognized that it is possible to securely and beneficially share information used to make authentication decisions and evaluate authentication risks.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein are implemented in authentication brokering systems where an authentication broker issues security tokens that represent its authentications of users. Client devices operated by the users store the security tokens and send them to resource providers. The resource providers authenticate and grant access to the users based on validation of the security tokens. Authentication related messages exchanged between the resource providers and the authentication broker are used to exchange authentication risk data that is obtained or derived by the resource providers and the authentication broker. The resource providers obtain authentication risk data directly from the authentication broker and indirectly, via the authentication broker, from each other. As security tokens are used or managed, authentication risk data is able to be shared among the participants in the authentication brokering system. The participants can modify their authentication procedures or make authentication decisions based on shared authentication risk data.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 8 shows an example of a schema for sharing risk data.

DETAILED DESCRIPTION

Embodiments discussed below relate to enabling the exchange of authentication-related risk information among participants of brokered authentication systems. As mentioned in the Background, prior authentication brokering systems treated each authentication as a local decision. When making authentication decisions for access to resources, resource providers would only take into account whether a token or the like was valid. Information that the authentication broker considered when authenticating a user for issuance of a token has not been shared with resource providers even though an authentication broker and resource providers may be authenticating access for a same person. Similarly, information that resource providers use for authentication has not been shared with the authentication broker, even when the resource providers are authenticating based on a credential or token issued by the authentication broker. Nor has it been possible for different resource providers making individual authentication decisions based on a same credential or token (from a same authentication provider) to share information used for their respective authentication decisions. The embodiments described herein may overcome some of these problems.

Figure 1:
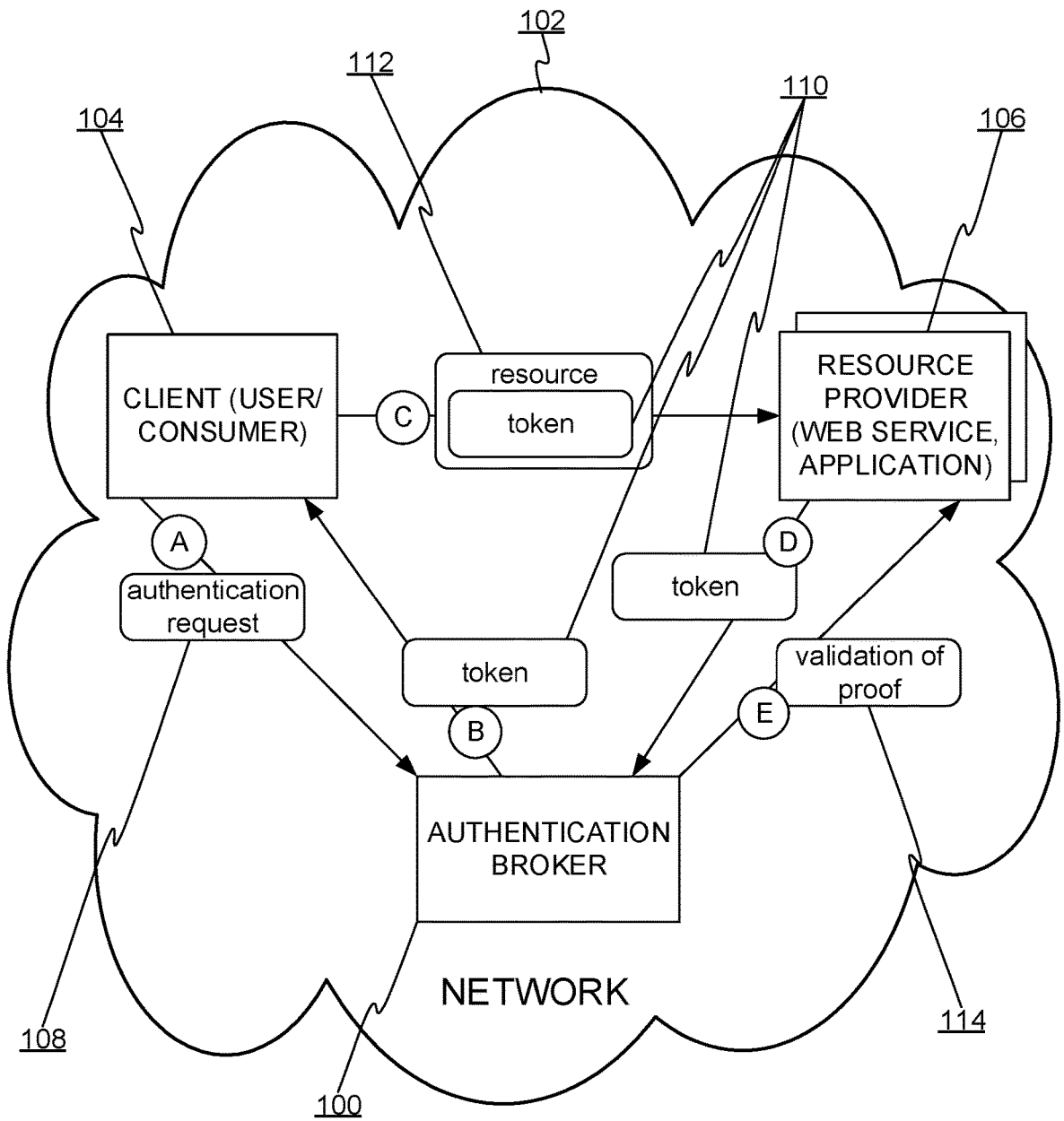
FIG. 1 shows an example of a brokered authentication system.

FIG. 1 shows an example of a brokered authentication system. Because different authentication brokering protocols use diverse terminology, some terms used herein will be explained. The meaning of these terms will be defined in part by comparison to existing authentication protocols. An authentication broker 100 is one or more server computers available on a network 102 such as the Internet. In terms of the OAuth 2.0 protocol, the authentication broker 100 could also be referred to as an "authorization server". In SAML terminology, the authentication broker 100 could be called an "identity provider". Others would use the term "broker server" or "security token service" (STS).

The authentication broker 100 provides network services that are available to any device to invoke over the network 102. The network services may include several types of functions, described below. The services may be accessed in a number of ways. The Simple Object Access Protocol (SOAP) can be used for exchanging messages carried over Hypertext Transfer Protocol (HTTP) channels (where used herein, "HTTP" also refers to HTTP Secure protocols, HPPT/2, and other standard variants of the HTTP). The authentication broker 100 may provide web services accessible through Representational State Transfer (RESTful) application programming interfaces (APIs); data may be conveyed in javaScript Object Notation (JSON) containers or files. Other protocols and data formats may be used. The authentication broker's services are typically implemented and accessed at the application layer and on top of a network transport layer. The transport/network layer may conform to a TCP/IP (Transmission Control Protocol/Internet Protocol) variant. If a known authentication protocol such as OAuth 2.0 or SAML is used, the protocol may be modified or augmented to implement the embodiments described herein. That is to say, the embodiments described herein may be implemented as extensions of known security protocols and/or data formats thereof.

The authentication broker 100 services clients 104 and resource providers 106. The clients 104 are devices operated by the end user. The clients 104 may be user-agent devices such as web browsers, mobile applications, and the like. The clients 104 may also be other web sites or network services that serve as applications for end users. The clients 104 may also be referred to as applications. In any case, a client 104 is a device that authenticates with the authentication broker 100 to obtain a token or similar credential and then uses the token to authenticate to the resource providers 106 to gain access to resources from the resource providers 106.

The resource providers 106 are devices that provide resources to be obtained by the clients 104. The resources may be web services, files, or other network-accessible resources. The resources are usually protected by requiring access through authenticated user accounts. That is, access to a given resource by a given end user may depend on a corresponding account or identity being authenticated by the corresponding resource provider 106. User identity may be authenticated directly using authentication factors managed by the resource provider 106. Of note herein, authentication may instead or additionally be based on credentials provided by the authentication broker 100. Authentication will be discussed further below. Resource providers 106 are sometimes referred to as "resource servers" (OAuth 2.0) or "service providers" (SAML).

An example brokered authentication will be described with reference to FIG. 1. At step A the client 104 issues an authentication request 108 to the authentication broker 100. In some scenarios and with some protocols, step A might be proceeded by other steps, such as redirections after requesting a resource from the resource provider 106. In response to the authentication request 108, the authentication broker 100 authenticates the identity of the end user. The authentication may involve the user presenting one or more authentication factors. The user authentication may be passed off to a separate identity provider that authenticates the identity presented by the user and informs the authentication broker 100 of the authenticated identity. The user authentication may even be provided by another authentication broker (a federated authentication broker). Notably, the authentication broker's authentication procedure may be informed by (or as part of) a risk evaluation procedure, as will be described later.

At step B, assuming that the authentication broker 100 authenticated the identity of the end user, then the authentication broker 100 issues an authentication credential such as a token 110. Note that there may be intermediate steps such as validating the client/application (perhaps verifying possession of a pre-registered secret key), exchanging an authorization code used to issue the token 110, etc. The token 110 is the credential that the client 104 provides to resource providers to be authenticated/authorized by the resource providers. The token 110 is a piece of information that the resource provider 106 allows to stand in the place of login credentials or the like. The token 110 enables the client to conveniently enter the security domains of the respective resource providers. The token 110 may be a self-contained token that contains all the information needed to validate the token. Or, the token 110 may be a reference token that has an identifier that can be looked up by the authentication broker 100 to access information related to issuance of the token 110. See the above-mentioned protocols for additional details about authorization/authentication tokens. As used herein, "token" refers to both types of tokens.

At step C the client 104 sends a resource request 112 to a resource provider 106. The resource request 112 may include (or be proceeded or followed by) the token 110, and other steps may be involved such as redirections to enable a smooth flow of control. The resource provider receives the resource request 112 and token 110 and begins to perform an authentication procedure to determine whether the client 104 is permitted to access the resource requested by the resource request 112. The resource provider 106 attempts to validate the token 110. Token validation might be proceeded by preliminary authentication measures for identifying risky clients or requests. Generally, token validation is just one aspect of a larger authentication procedure performed by the resource provider 106 to determine whether to grant access to the requested resource. If the token 110 is self-contained, then the resource provider might validate the token 110 itself. More often, as at step D, the resource provider 106 will pass the token 110 to the authentication broker 100. The authentication broker 100 uses known techniques to validate the token 100 and returns validation proof 114 to the resource provider 106. At the resource provider 106 the validation proof 114 is likely a necessary condition for authenticating the user but may not be a sufficient condition; the resource provider 106 may have other security requirements as described below.

Figure 2:
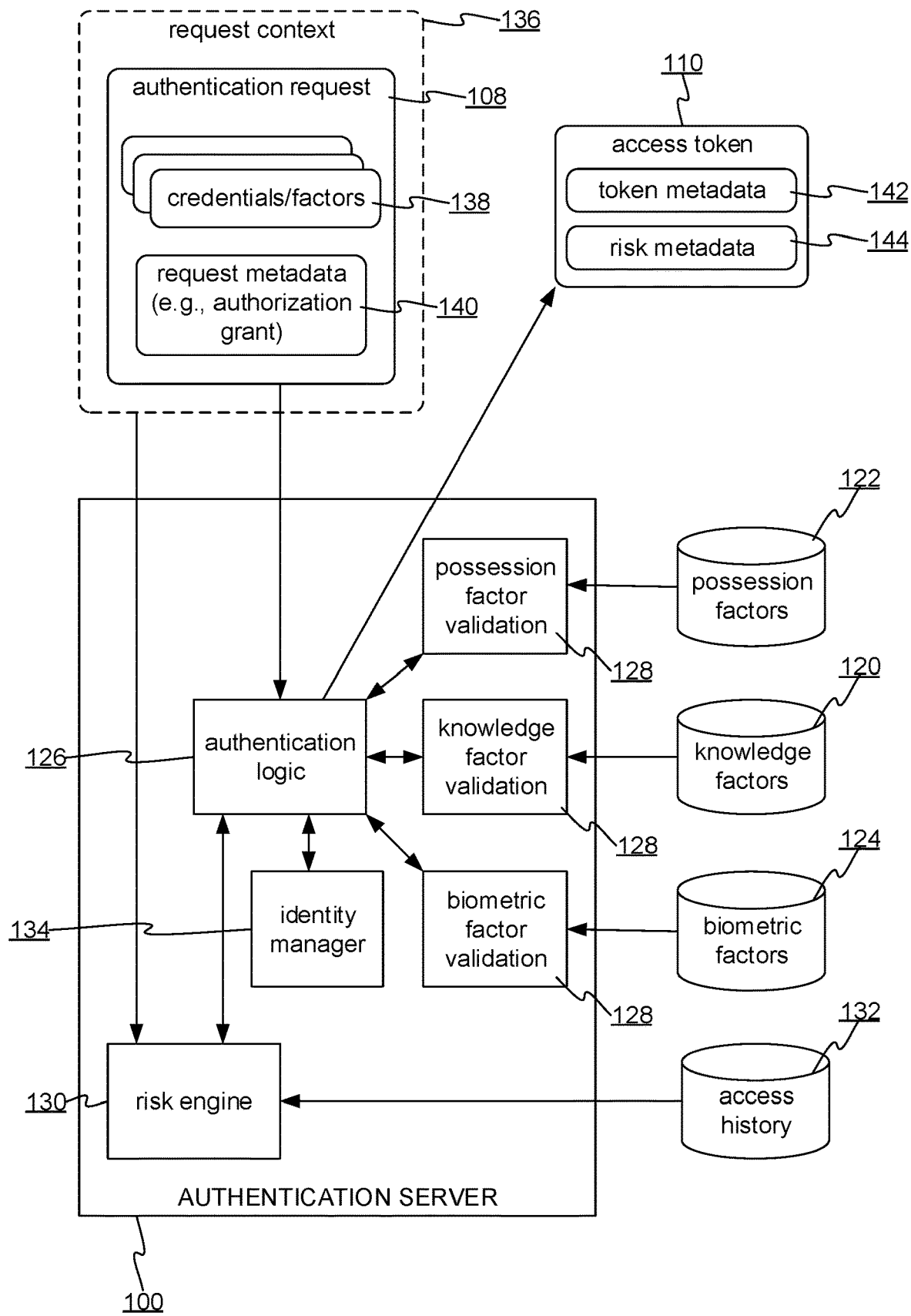
FIG. 2 shows details of an authentication broker.

FIG. 2 shows details of an authentication broker 100. For discussion, the elements and functions of the authentication broker 100 may be assumed to be one or more computing devices and/or virtual machines operating under one security domain. However, some functions, such as identity management, may be handled by an identity provider or the like. From the point of view of resource providers 106 and clients 104 the authentication broker is a network service accessible through network APIs or application-layer security protocols.

A primary function of the authentication broker 100 is to authenticate user identities (user identifiers). That is, when a subject (computer, application, user, etc.) presents a user or account identity to the authentication broker 100 (e.g., a login name or account number), the authentication broker 100 is able to acquire authentication factors and evaluate the acquired authentication factors against secure (secret) authenticator factors associated with the identity to confirm that the identity exists and that the subject is authorized to use the identity.

Modern authentication may involve one or more authentication factors. The most common type of authentication factor are knowledge factors 120 such as passwords, pins, pass phrases, or other information expected to be kept in human memory. Possession factors 122 are another type of factor which show that a specific physical object associated with a user identity is possessed. Automated teller machine (ATM) cards, physical security tokens, cellular terminals, and the like are types of possession factors. Biometric factors 124 are another type of factor that can be used to authenticate a subject. Biometric factors can be measures of fingerprints, hand geometry, facial features, iris/retina features, or others. The term "authentication factor category" as used herein refers to the possession factor category, the knowledge factor category, or the biometric factor category. The term "authentication factor" as used herein refers to specific types of factors within the categories and their corresponding validatable data. Passwords, retina scans, one-time passwords, credit card information, mobile phone authentications, and smartcards, are examples of authentication factors.

Authentication factors are just one type of information potentially used in some authentication procedures. Authentication may also involve risk evaluation. The authentication broker 100 may have a risk engine 130 that computes risk score or probabilities for risks such as general authentication risk (confidence of an approved authentication), or specific types of authentication risks, such as the risk of leaking sensitive information to an unsecured device, based on information related to an authentication request. Risk scores can be incorporated into the authentication making decision. For additional details on risk assessment modeling, see U.S. Pat. No. 9,396,332. For example, if adaptive authentication is desired, different ranges of general risk scores may control how many authentication factors and/or which authentication factors need to be satisfied. Higher risk scores might lead to increasing numbers or types of authentication factors.

Computing risk scores often involves evaluating current conditions or context related to an authentication and comparing the current conditions with past conditions or contexts related to authenticating. Each time a subject is authenticated, conditions or context related to the authentication may be recorded in an access history store 132. The more the current conditions and context deviate from past the conditions and contexts, the higher the risk. Deviations may be combined in a weighted fashion using any type of multidimensional distance formula. Alternatively, conditions may be evaluated using machine learning, where current conditions are represented in feature vectors, and risk may be represented probabilistically.

Risk evaluation conditions and context can include: geographic location of the subject, network address or domain of the subject, features of the client or user agent (e.g., which web browser and/or version, device identity, device type, operating system, device software and OS patch compliance), a source that redirected to the authentication server to initiate authentication, time of day, day of the week, cookies and their settings (e.g., expire period if any), authentication/login frequency or time since a prior authentication, authentication factors or categories that previously failed, stale authentication factors, sensitivity of the resources being accessed, secure state of the requesting device, and others. Risk evaluation conditions may also be global or external, that is, not specific to a specific subject or transaction. For example, the authentication broker or another security domain might detect a network attack, an uptick in failed authentications, or other signals that indicate increased systemic risk. Such conditions might be incorporated into the authentication process.

An authentication module or logic 132 may coordinate and control how a subject is authenticated. The authentication logic 132 uses factor validation modules 128 to validate factors presented for authentication against stored factors. A biometric factor validation module, for instance, may be configured to compare stored biometric factors (fingerprints, retina scans, typing features, voice data, etc.) in the biometrics factors 124 with biometric factors sensed in conjunction with an authentication attempt. The authentication logic 126 may also receive risk scores and risk evaluation data from the risk engine 130. As mentioned, in some embodiments, risk data can inform both how an authentication is performed and whether an authentication should be granted. In some cases, an authentication factor may be found invalid and yet, based on a sufficiently low risk score, authentication may be confirmed. Not all authentication servers need to use multiple authentication factors or any of the authentication factors or authentication categories mentioned above. Nor do all authentication servers employ formal risk evaluation. However, many authentication servers will employ some information relevant to risk and will make implicit risk decisions in their authentication procedures. How authentication risk information may be shared and employed is described further below.

Another function of the typical authentication server is some type of identity manager 134. The identity manager 134 maintains a set of unique user identifiers that can be linked to user-specific history in the access history 132 and user-specific authentication factors stored with the knowledge factors 120, possession factors 122, and/or the biometric factors 124. Each authentication and corresponding token 110 is associated with a corresponding identity and represents an authentication of that identity. The authentication request 108 and token 110 shown in FIG. 2 are represented as single respective messages. In practice, the equivalent information may involve multiple exchanges of messages, depending on which protocol is used.

Regarding exchanging authentication data with an authentication broker 100, an application-layer API or similar interface is used via the network 102 to submit an authentication request 108 and receive an access token 110. An authentication request 108 may be accompanied by request context 136, which, as mentioned above, may include information about the client/user-agent device, the time of the request, the network location where the request originated, the geographic origin of the request, or any technical information that can be obtained in association with the authentication request 108. The authentication request will generally include one or more authentication credentials or factors 138, as well as metadata describing the identity to be authenticated, details of the authentication request 108, perhaps digests of the request signed by a private key, and the like. The authentication credentials or factors 138 and the authentication request 108 may be conveyed in different message transmissions that are part of a same authentication transaction. See the protocols mentioned above for examples of information that may accompany an authentication request 108.

The access token 110 may include a unique string that serves as a validatable credential; a signed nonce, a random number, or any other authentication identifier that can later be validated by the authentication server. The access token 110 may also include token metadata 142 and risk metadata 144.

In addition to known token fields described in the protocols mentioned above, the access token 110 optionally includes risk metadata 144, which is any risk-related data involved in the corresponding authentication procedure such as a general risk score, a confidence level, information about how the authentication was performed (how many factors, which, which categories), information about the request context related to risk, relevant authentication context history, information about which contextual factors were determined to be risky or not risky (e.g., time of day, geographic location), etc. Any type of information that may be used by resource providers to estimate risk in their own authentication procedures may be included, preferably excluding personally identifiable information. The shared information need not be information that was actually used by the authentication broker to authenticate the user that requested the token 110.

Figure 3:
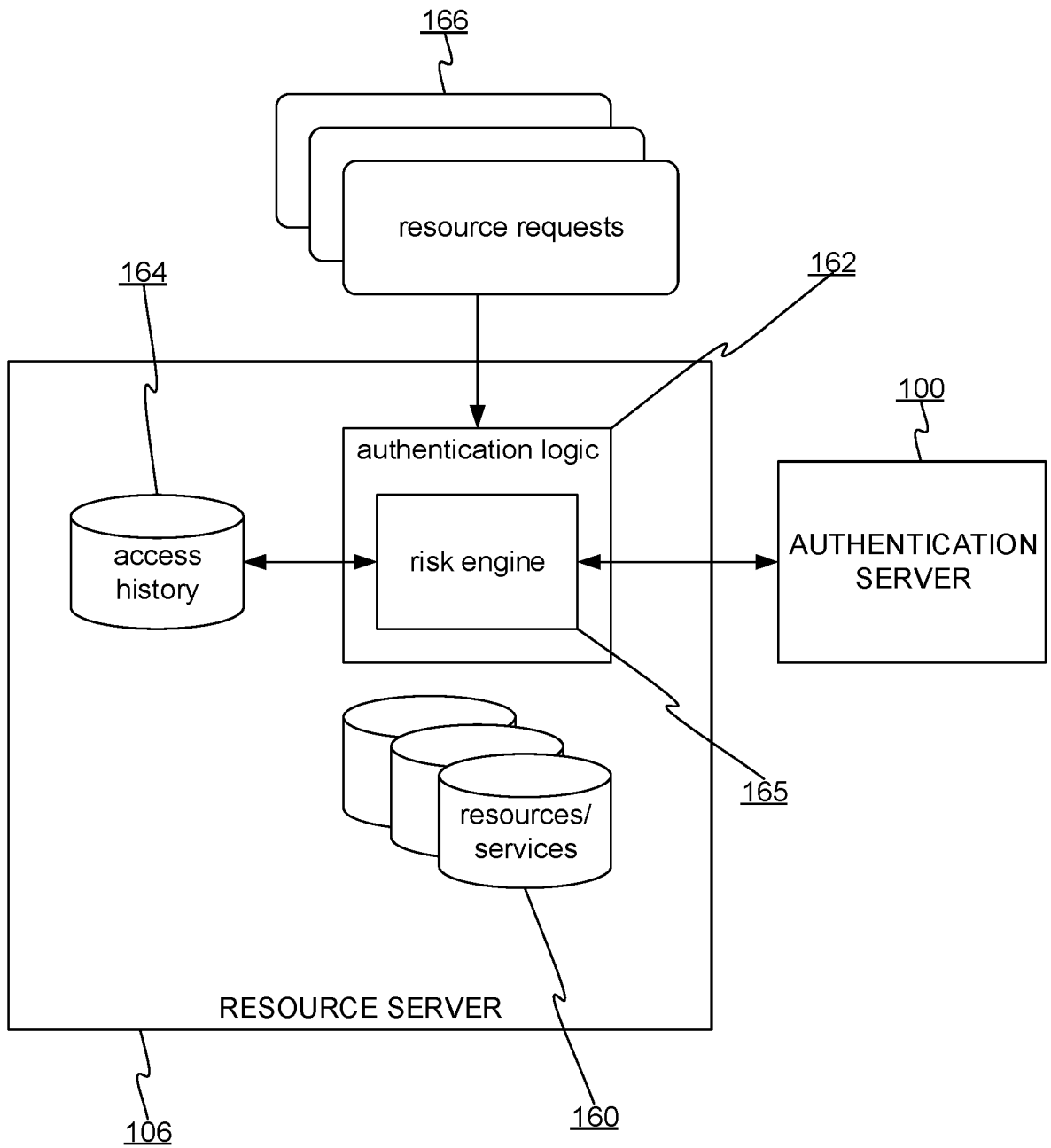
FIG. 3 shows details of a resource provider.

FIG. 3 shows details of a resource provider 106. The resource provider 106 provides resources 160 to clients or user-agent devices. The resource provider 106 may be a web server or other network service that implements an application-layer protocol for exchanging application-layer data (most aspects of the embodiments described herein are implemented above the network transport layer). The resource provider 106 may be a physical server or a logical server executing in a cloud hosting environment. The resource provider 106 is equipped with network communication facilities such as a network interface and protocol stack (e.g., TCP/IP) for communicating over the network 102. A typical resource provider 106 is capable of HTTP communication to exchange messages with clients or user-agent devices as well as with authentication brokers 100. The resources 160 may be any type of data and will be convenient to identify using Uniform Resource Locators (URLs). A resource 160 may be a network API which requires authentication to use.

The resource provider 106 includes authentication logic 162. The authentication logic 162 may perform known authentication techniques, such as those of the authentication broker 100 described above. For instance, the authentication logic 162 may have its own access history 164 describing access patterns of users, for instance. Deviations or probabilistic risk assessment from past access patterns may contribute to rejection of authentication requests or reducing or increasing the number or categories of authentication factors that need to be validated (adaptive authentication). Deviation or outlier-based risk assessment is one way to measure risk, but this is a subset of more general probabilistic methods that may be used. Any known prior authentication techniques may be extended or modified in ways described herein. Specifically, the authentication logic 162 may use shared authentication risk data when deciding how and whether to authenticate a user. If a risk engine 165 is used then the risk engine 165 may use risk data received from the authentication broker to determine a general risk level or to determine risk with respect to particular resources 160 or particular aspects of an authentication.

The authentication logic 162 is used to authenticate or authorize resource requests 166 from clients 104. Although a resource provider 106 might use an authentication broker to authenticate a user identity, validation by the authentication broker may not be the only aspect of the resource provider's local authentication or authorization decision. In other words, a valid token 110 may be a necessary—but not sufficient—condition for authentication or authorization.

In some embodiments, a resource provider 106 might manage its own user identities, authentication factors, and validation procedures for the same, and in some cases the resource provider 106 may require local identity authentication as well as brokered authentication. Regardless of implementation details, what is significant is that resource providers 106 have their own authentication procedures and in the process of making an authentication decision (even when authentication factors are not required) they may evaluate the risk of an authentication. Consequently, information about risk can be shared directly with the authentication broker 100 and indirectly, via the authentication broker, with other resource providers.

Figure 4:
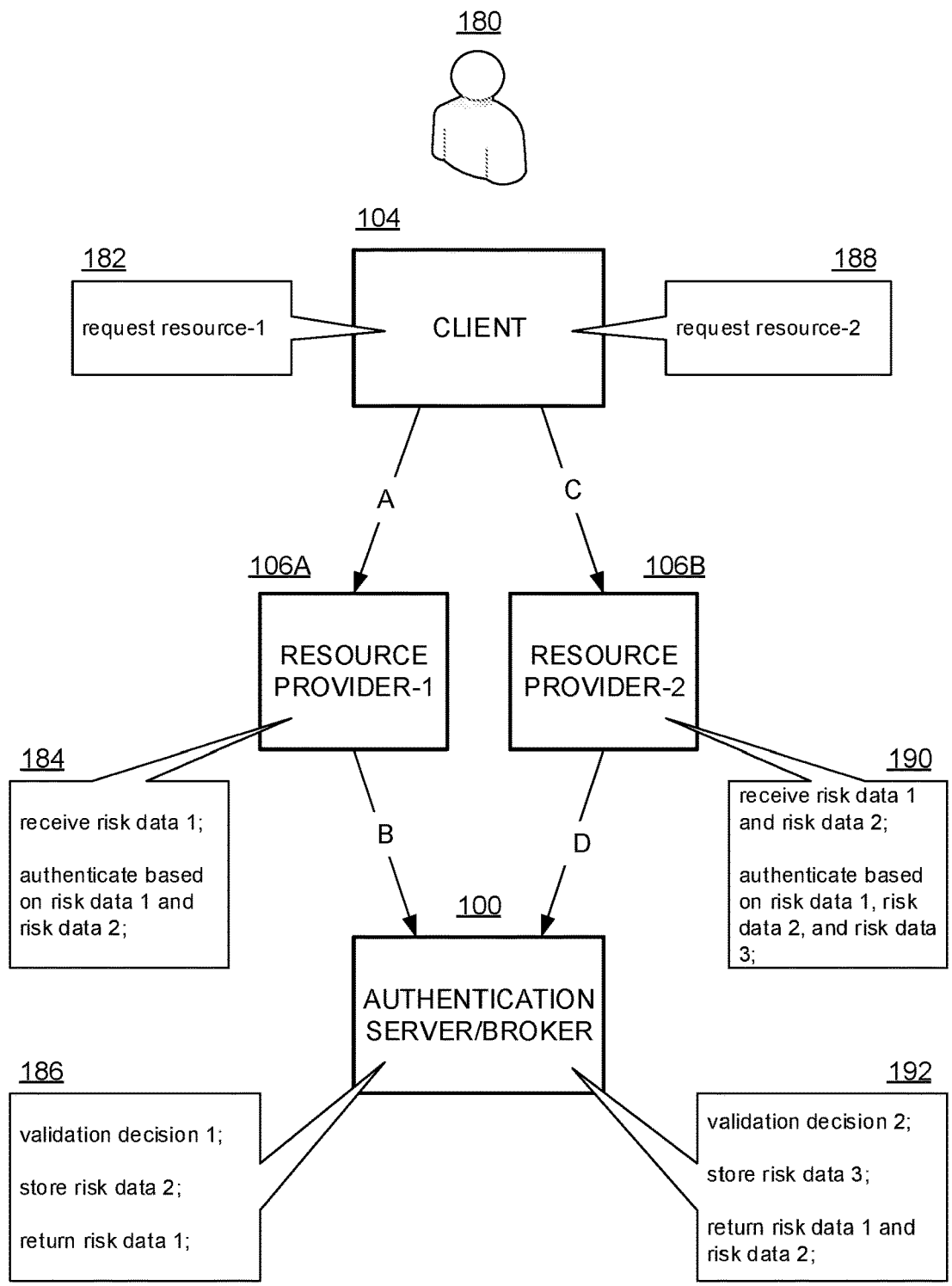
FIG. 4 shows how risk data can flow when authentication is brokered.

FIG. 4 shows how risk data can flow when authentication is brokered. A user 180 operates a client 104 that has already authenticated with the authentication broker 100 and is storing a corresponding token issued by the authentication broker 100. At step 182 the client transmits a first request (arrow A) for a first resource via the network 102 to a first resource provider 106A, which causes the first resource provider, at step 184, to begin its own authentication process. The token provided by the client 104 accompanies the first resource request received by the first resource provider 106A. As part of its authentication process for the first resource request, the first resource provider 106A sends the token (arrow B) to the authentication broker for validation. Because the first resource provider 106A has already begun its authentication process, it may have already made some risk assessment, calculated a risk score, gathered risk-related contextual data, etc. Any such risk data ("risk data 2", or "second risk data") may be included with the token validation request.

At step 186 the authentication broker 100 validates the token. The authentication broker 100 may have performed some formal or informal risk analysis as described with reference to FIG. 2, either when authenticating the user 180 to issue the token, when providing an authorization code grant (OAuth 2.0), and/or when validating the token. The authentication broker's risk data ("risk data 1", or "first risk data") is provided to the first resource provider 106A with a message indicating validation of the token. For instance, an RFC 7662 introspection response message may be transmitted, which may include a jSON object with extension fields for sharing the first risk data (token introspection is a form of token validation). Similarly, the first risk data can be included in an extended token-refresh reply, a grant of an access token, or other message exchanges.

When the first resource provider 106A receives the token validation message it extracts the first risk data. The first resource provider 106A completes its authentication decision based on the validation of the token, based on its own risk data ("risk data 2", or "second risk data"), and based on the authentication broker's first risk data. Data from two different authenticators might individually be innocuous, but when combined may reveal risks. For example, if the first risk data indicates that the token was authenticated for and issued to a device in Europe, and if the second risk data indicates that the first resource request originated from Asia, then the first resource provider 106A might disregard the valid token and deny the request. Or, if the first risk data includes a confidence score of say 0.5 (on a 0 to 1 scale), the first resource provider might incorporate that factor in its own confidence scoring to determine that there is insufficient confidence to authorize the first request. As will be seen next, the sharing of authentication risk data in this way can improve brokered authentications even further by indirectly distributing risk data relevant to a particular token and user among any of the resource providers that might be authenticating the same user based on the same token.

After the first resource request, at step 188 the client 104 uses the token to issue a second resource request to a second resource provider 106B (arrow C). The second resource request also includes the token. At step 190 the second resource provider 106B begins its own authentication process. The second resource provider 106B may have its own risk data, scores, or risk-related context data ("third risk data", or "risk data 3 "). When the second resource provider 106B sends the token in a second validation request to the authentication broker 100 for validation (arrow D), the second resource provider 106B optionally includes the third risk data in the same message (or in a message that is part of a validation transaction of an authentication protocol).

At step 192 the authentication broker 100 receives the second validation request and makes a second validation decision. The third risk data is stored for future distribution by the authentication broker. The authentication broker's reply to the validation request may include its own risk data (first risk data) as well as the risk data collected from other resource providers (e.g., risk data 2). The risk data from other resource providers might be implicit in the returned risk data. For example, the authentication broker might return a risk or confidence score computed based on risk data or scores from other resource providers.

Figure 5:
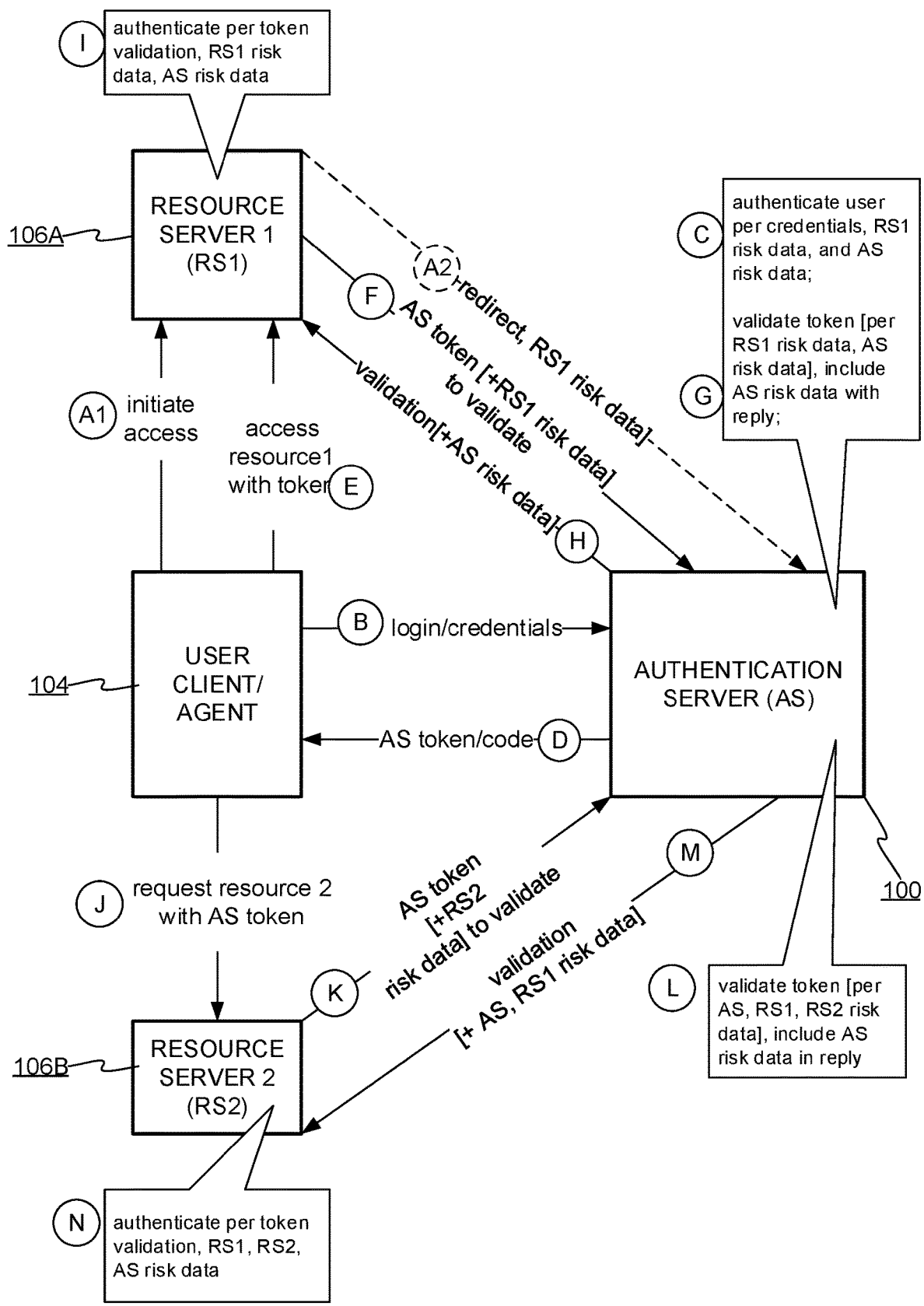
FIG. 5 shows other techniques for sharing authentication risk data in a brokered authentication system.

FIG. 5 shows other techniques for sharing authentication risk data in a brokered authentication system. While risk data may be shared during token validation transactions, other brokering transactions can be used to exchange risk data. For example, messages leading to or implementing an initial user authentication with the authentication broker 100 may be used to exchange data for evaluating authentication risk. In FIG. 5, initially, no authentication of the client 104 (or user) has taken place. The client 104 determines that a specific resource (e.g., URL1) is needed from the first resource provider 106A. At step A1 the client initiates access by requesting URL1 (the resource could also be a login page of the first resource provider). At step A2 the first resource provider optionally issues a redirect to the authentication broker. The redirect request may include risk data from the first resource provider ("RS1 risk data"), which the authentication broker can store as part of the set of risk-related data associated with the current transaction. At this stage, information available to the first resource provider might include browser cookie data, network or geographic location of the client, data entered by the user, and so forth. Preferably, personal information is either translated to non-personal form or is not shared.

At step B the client 104 provides login credentials (e.g., one or more authentication factors) to the authentication broker. At step C the authentication broker authenticates the user/client and provides a token. At step E the client provides the access token in connection with the original resource request for URL1. The first resource provider begins its authentication procedure and forwards the token to the authentication broker for validation. The first resource provider also forwards any information that it has locally obtained in connection with evaluating the request for the resource ("RS1 risk data"). At step G the authentication broker stores the received RS1 risk data and optionally uses the data when validating the token. At step H a validation reply is returned which optionally includes information ("AS risk data)") used by the authentication broker. The AS risk data can include risk data obtained or derived when the authentication broker authenticated the user/client at step C. The AS risk data might include typing cadence data, failed login counts, contextual data, deviations from prior login patterns, to name a few examples.

At step I the first resource provider has received the token validation as well as the AS risk data and completes its authentication process according to the AS risk data and its own local risk data. If the authentication or authorization procedure of the first resource provider is successful then the client is given access to URL1.

When the user/client goes to access another resource (e.g., URL2) at the second resource provider, authentication/risk evaluation data is shared as described with reference to FIG. 4. At step j the second resource provider requests URL2 with the token. The second resource provider begins its authentication process by sending the token and any authentication-relevant data it has ("RS2 risk data") to the authentication broker. At step L the authentication broker validates the token, optionally using imported and/or local risk data. At step M the authentication server returns proof of validation in addition to any relevant authentication risk data that it has collected in connection with authentication of the user/client or in connection with issuance of the token. At step N the second resource server completes its authentication procedure according to local RS2 risk data as well as any imported risk data such as the RS1 risk data and the AS risk data.

If risk scoring is desired, for instance to facilitate adaptive authentication factor selection, then it will be helpful if the authentication brokering is based on a common risk data schema and/or a common risk evaluating algorithm. Preferably, any risk evaluation algorithm is able to make coarse risk estimates when little risk data available. The more risk data that is available the more accurate the estimate. Most or all risk data elements may be treated as optional. In this way, the best use can be made of any available risk data, whether local or imported. Globally meaningful risk estimations can also be implemented by providing a third party web service API. An authenticating device can pass in whatever risk data it has and receive a risk estimation in return. In one embodiment, all participants in the authentication brokering system "agree" to conform to a same risk scale or risk scoring system. Regardless of how achieved, a common risk evaluation scheme will allow risk scores to have system-wide consistent meaning among different devices and security domains.

Figure 6:
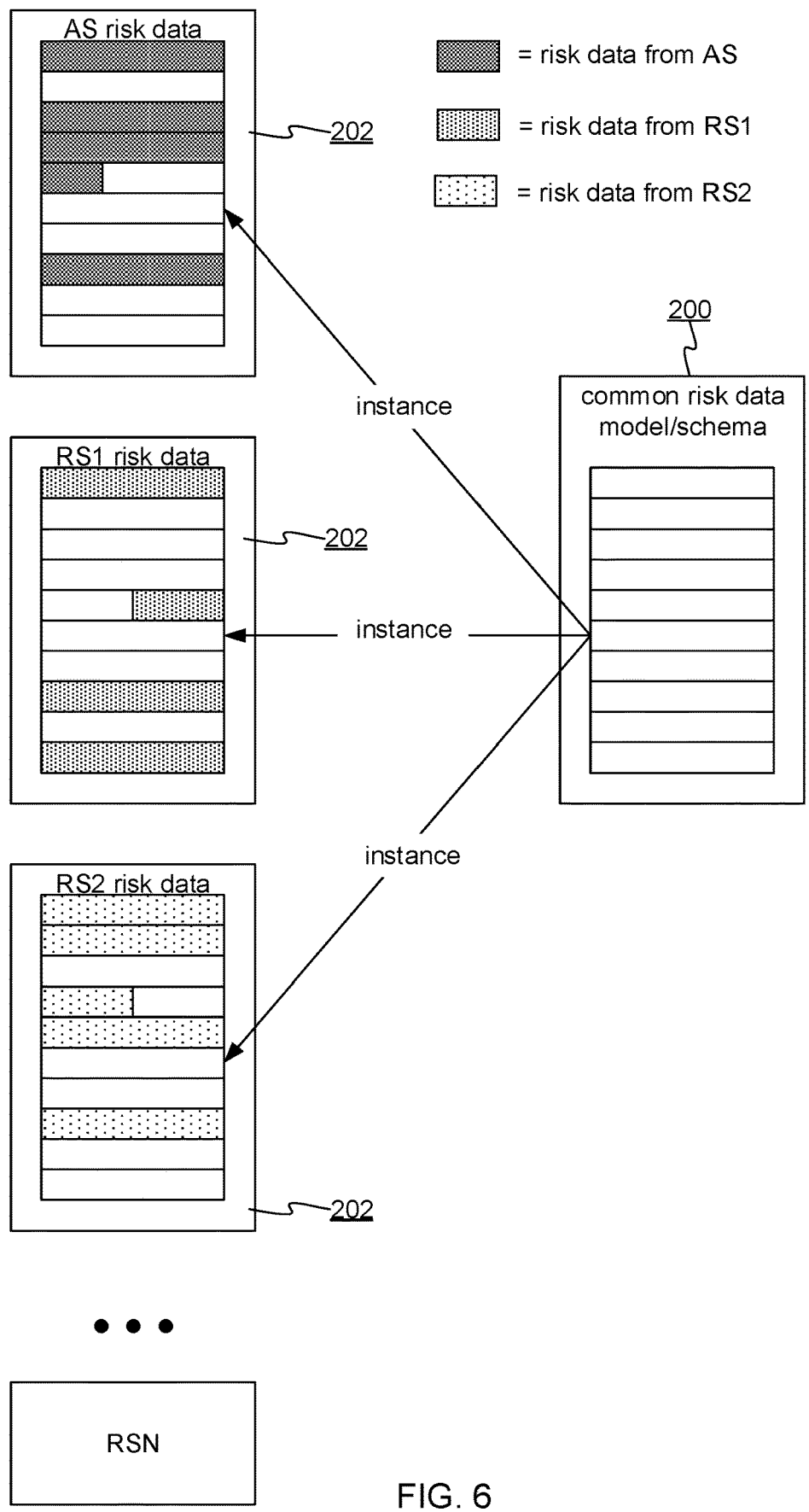
FIG. 6 shows how a shared or standard authentication risk data schema can be used to facilitate sharing authentication risk data.
Figure 7:
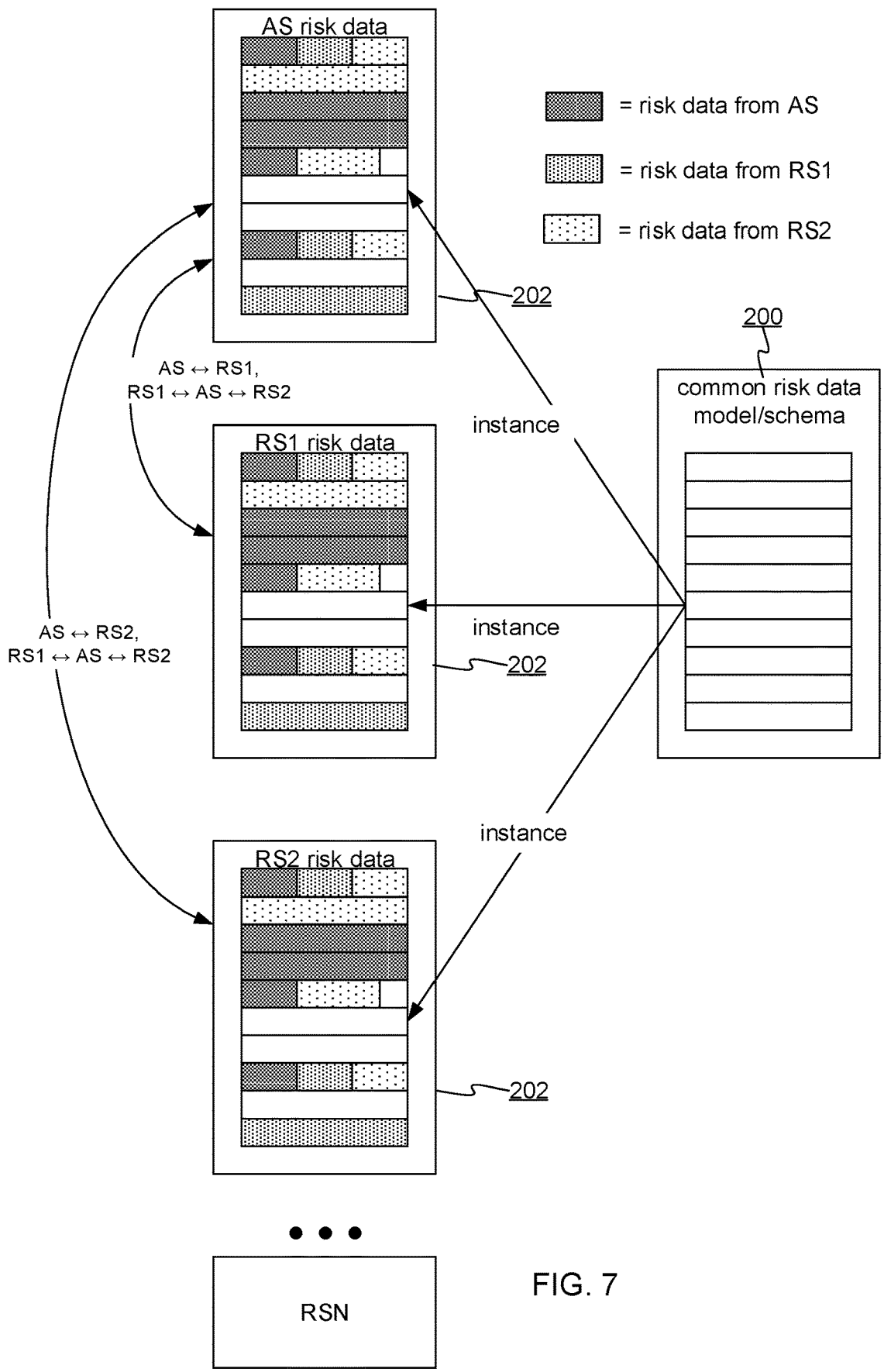
FIG. 7 shows how risk data can accumulate.

FIG. 6 shows how a shared or standard authentication risk data schema 200 can be used to facilitate sharing authentication risk data. The schema 200 may be specified in a markup language. The authentication broker and resource providers may have risk data instances 202. Each risk data instance 202 corresponds to a same token or user identity. Initially, as shown in FIG. 6, each risk data instance 202 is populated only with local risk data. For example, the authentication broker's risk data instance 202 has only risk data available to the authentication broker. As shown in FIG. 7, over time, as the resource providers interact with the authentication broker, the authentication broker builds a growing union of its own risk data as well as all the risk data that has been shared from resource providers. As more resource providers authenticate using the same token (or refreshes thereof), then the growing union of risk data accumulated by the authentication broker propagates down to later resource providers. FIG. 8 shows an example of a schema 200 for sharing risk data. It should be understood that a common schema 200 and/or risk estimation algorithm is not needed. A pre-defined set of fields or parameters may be used and each security domain may do as it pleases with any shared authentication risk data.

Figure 9:
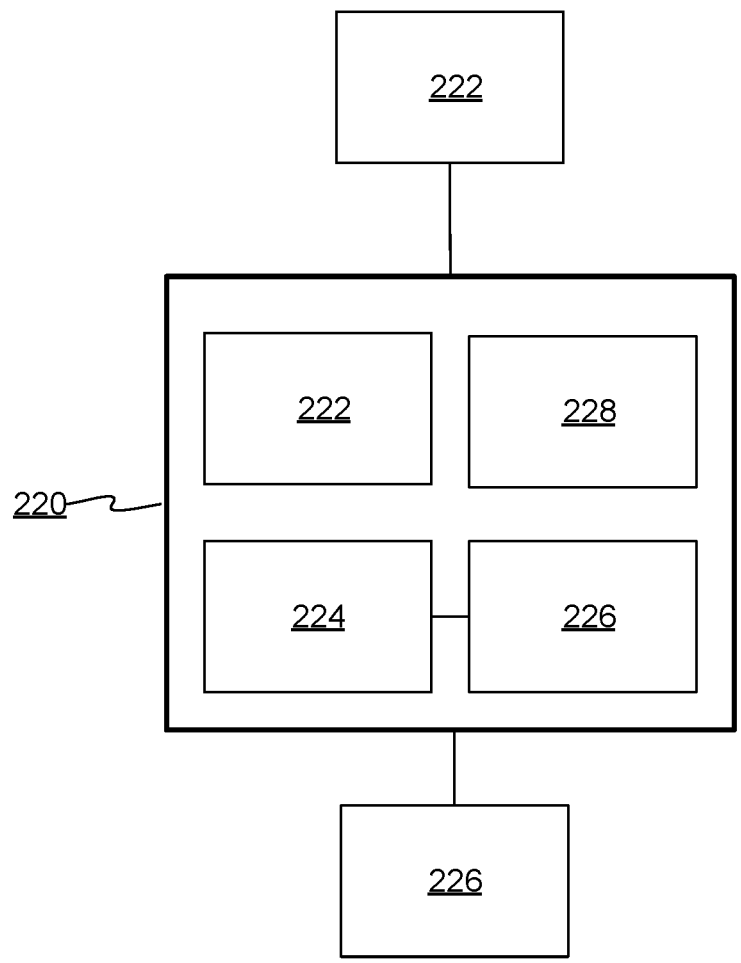
FIG. 9 shows details of a computing device.

FIG. 9 shows details of the computing device 220 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 220 to implement any of the features or embodiments described herein.

The computing device 220 may have one or more displays 222, a network interface 224 (or several), as well as storage hardware 226 and processing hardware 228, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 226 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 220 may cooperate in ways well understood in the art of machine computing. In addition, input devices may be integrated with or in communication with the computing device 220. The computing device 220 may have any form-factor or may be used in any type of encompassing device. The computing device 220 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 228. The stored information can be in the form of machine executable instructions (e.g., compiled executable binary code), source code, byte-code, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by an authentication brokering service comprising one or more computing devices comprising processing hardware and storage hardware configured with instructions to enable the processing hardware to perform the method, the method performed by the authentication brokering service comprising:

receiving, by the authentication brokering service, an authentication request via a network from a client device operated by a user to authenticate a user identity that corresponds to the user, the authentication request generated by the client device, the authentication request received in a first message, the first message comprising a message conforming to an application-layer protocol, the authentication request comprising a request to authenticate the user identity that corresponds to the user;

based on the authentication request, performing, by the authentication brokering service, a first authentication procedure to authenticate the user identity, the authenticating by the first authentication procedure comprising:

validating that an authentication factor provided by the client device via the network matches a stored authentication factor pre-associated with the user identity, obtaining first authentication risk factors;

obtaining a risk score computed based on the first authentication risk factors; and authenticating the user identity based on the validating of the authentication factor and based on the risk score;

based on the authenticating of the user identity by the authentication brokering service: generating a security token associated with the user identity, storing an indication of the security token, generating a second message conforming to the application-layer protocol, the second message comprising the security token, and transmitting the second message to the client device via the network;

storing, by the authentication brokering service, the first authentication risk factors in association with an indication of the security token that is stored by the authentication brokering service;

receiving, by the authentication brokering service, a validation request via the network, the validation request generated and transmitted by a first resource provider incorporating the security token into the validation request based on having received the security token from the client, the validation request generated by the first resource provider in association with a second authentication procedure performed by the first resource provider, the first resource provider comprising an application-layer network service executed by one or more computing devices that requires authentication of clients to serve resources to the clients via the network, the validation request comprising a third message conforming to the application-layer protocol, the validation request comprising the security token, the security token having been provided to the first resource provider by the client, the validation request further comprising second authentication risk factors obtained by the first resource provider in association with the second authentication procedure;

storing the received second authentication risk factors in association with the indication of the token;

based on the validation request, validating the received security token, and based on the validation generating a validation confirmation message conforming to the application-layer protocol, the generating the validation confirmation message comprising incorporating the first authentication risk factors in the validation message based on first authentication risk factors being stored in association with the indication of the security token; and transmitting the validation confirmation message to the first resource provider via the network.

2. A method according to claim 1, wherein the first resource provider performs the second authentication procedure based on the first authentication risk factors being received in the validation confirmation message and based on the second authentication risk factors.

3. A method according to claim 1, further comprising:
receiving a second validation request from a second resource provider, the second validation request comprising the security token;
based on the second validation request, validating the security token from the second validation request and generating a second validation confirmation message by incorporating therein the first authentication risk factors and the second authentication risk factors; and
transmitting the second validation confirmation message via the network to the second resource provider.

4. A method according to claim 3, wherein the second resource provider authorizes the client device to access a resource provided thereby by authenticating the client device based on the first authentication risk factors and based on the second authentication risk factors.

5. A method according to claim 1, wherein the first authentication risk factors comprise context information describing context of the authentication request.

6. A method according to claim 1, wherein the first authentication procedure comprises computing a risk score or risk probability according to context history of past authentication contexts stored in association with prior authentication requests for the user identity.

7. A method according to claim 1, wherein the authentication broker validates the token based on the second authentication risk factors.

8. A method according to claim 1, wherein the validating the received security token is performed according to the stored indication of the security token.

9. A method performed by an authentication brokering service comprising a first computing device, the method comprising:
receiving, by the authentication brokering service, an authentication request via a network from a client application to authenticate a user, the authentication request originated by the client application, the authentication request received in a first message, the first message comprising a message conforming to an application-layer messaging protocol, the authentication request comprising a request to authenticate the user and comprising information associating the authentication request with the user;
based on the authentication request, performing, by the authentication brokering service, a first authentication procedure to authenticate the user, the first authentication procedure comprising validating an authentication factor provided by the client application via the network with a stored authentication factor associated with the user identity, wherein the first authentication procedure authenticates the user identity;
based on the authentication of the user identity by the authentication brokering service, generating a token associated with the user identity, storing an indication of the token, generating a second message conforming to the application-layer protocol, the second message comprising the security token, and transmitting the second message to the client device via the network, wherein the client application is configured to receive and store the token and to provide the token via the network to resource providers;
receiving a first application-layer message from a first resource provider via the network, the first resource provider comprising a second computing device providing application-layer resources via the network, the first application-layer message comprising first authentication risk data derived or obtained by the first resource provider to compute a first risk scored used when performing a second authentication procedure to authenticate the user, wherein the second authentication procedure uses the token and the first risk score to determine whether to authenticate the user, and wherein the authentication brokering service stores the first authentication risk data in association with the indication of the token; and
receiving a second application-layer message from a second resource provider via the network, the second resource provider comprising a third computing device providing application-layer resources via the network, the second application-layer message comprising second authentication risk data derived or obtained by the second resource provider to compute a second risk score used when performing a third authentication procedure to authenticate the user, wherein the second authentication procedure uses the token and the second risk score to determine whether to authenticate the user, and wherein the authentication broker stores the second authentication risk data in association with the indication of the token, wherein, based on the stored the associations of the first and second authentication risk data with the indication of the token, the authentication brokering service shares the first and second authentication risk data with other resource providers when the other resource providers request verification of the token.

10. A method according to claim 9, wherein the application-layer protocol comprises a Hypertext Transfer Protocol (HTTP), wherein the first and second resource providers comprise respective web servers in respective different security domains, and wherein the resources provided by the first and second resource providers are provided according to requests for Uniform Resource Locators (URLs).

11. A method according to claim 9, wherein the authentication broker comprises a Security Token Service (STS) endpoint or is configured to function as an authorization server specified by an OAuth standard.

12. A method according to claim 9, further comprising receiving an introspection request conforming to an OAuth standard, the introspection request comprising the token, based on the stored associations and the token, generating an introspection response comprising the first and second authentication risk data, and transmitting the introspection response to a device that sent the introspection request.

13. A method according to claim 9, wherein the second resource provider computes a risk score estimating risk of authenticating or authorizing the user based on the first authentication risk data, the first authentication risk data received from the authentication brokering service.

14. A method according to claim 9, wherein the first resource provider, the second resource provider, and the authentication broker each compute authentication risk scores that conform to a same risk scale or model.

15. A method for providing application-level identity authentication brokering, the method performed by one or more computing devices, the method comprising:
authenticating users by issuing security tokens to respective clients operated by the users, the tokens issued over a network by a security token service (STS) server, and wherein the security tokens are stored by the clients that provide the security tokens respective resource servers for authentication thereby, the security tokens comprising respective indications of respective user authentications issued and signed by the STS server;
sending and receiving token request messages over the network between the resource servers and the STS server, each token request message comprising either a security token validation request, a security token validation confirmation, a security token refresh request, a response to a security token refresh request, or a security token issuance, wherein the token request messages comprise risk data obtained and/or computed by the resource servers and the STS server to compute risk scores in association with authenticating the user accounts; and
storing portions of the risk data on the resource servers and the STS server for use in subsequent authentications, wherein, for a given user account having a corresponding given security token and having corresponding given portions of the risk data, a first resource server stores a first given portion of the risk data that originated from another resource server and that was provided in a token request message from the STS server, a second resource server stores a second given portion of the risk data that received from the STS server in a token request message, and wherein the STS server stores a third given portion of the risk data received from at least one of the resource servers in a token request message, wherein the stored given portions of risk data are used for subsequent authentications of the user account.

16. A method according to claim 15, further comprising at least some of the resource servers authenticating user accounts based on risk data from other resource servers and from the STS server.

17. A method according to claim 15, further comprising the STS server authenticating accounts or validating security tokens based on portions of the risk data from at least some of the resource servers.

18. A method according to claim 15, wherein the token requests are exchanged through Representation State Transfer (RESTful) application programming interfaces (APIs) implemented by the resource servers and the STS server.

19. A method according to claim 9, wherein the second resource provider computes a risk score estimating risk of authenticating or authorizing the user based on the first and second authentication risk data.

* * * * *